(12) United States Patent
Weber

(10) Patent No.: US 8,267,452 B2
(45) Date of Patent: Sep. 18, 2012

(54) PRODUCT GRIPPER

(75) Inventor: Guenther Weber, Gross Nemerow (DE)

(73) Assignee: Weber Maschinenbau GmbH Breidenbach, Breidenbach (DE)

( * ) Notice: Subject to any disclaimer, the term of this patent is extended or adjusted under 35 U.S.C. 154(b) by 0 days.

(21) Appl. No.: 12/660,701

(22) Filed: Mar. 2, 2010

(65) Prior Publication Data
US 2010/0225131 A1    Sep. 9, 2010

(30) Foreign Application Priority Data
Mar. 9, 2009    (DE) .................. 10 2009 012 331

(51) Int. Cl.
*B25J 15/02* (2006.01)
(52) U.S. Cl. ....................... 294/207; 294/86.4
(58) Field of Classification Search .......... 294/119.1, 294/103.1, 116, 2, 88, 86.4, 67.33, 81.54, 294/207; 414/735; 53/251, 260; 901/45, 901/49
See application file for complete search history.

(56) References Cited

U.S. PATENT DOCUMENTS

| | | | |
|---|---|---|---|
| 4,858,974 A * | 8/1989 | Stannek | 294/2 |
| 5,282,659 A * | 2/1994 | Yasuraoka et al. | 294/2 |
| 6,505,397 B1 * | 1/2003 | Mimata et al. | 29/740 |
| 7,904,198 B2 * | 3/2011 | Hawes | 700/230 |
| 2009/0317221 A1 * | 12/2009 | Hawes | 414/618 |

FOREIGN PATENT DOCUMENTS

| | | |
|---|---|---|
| DE | 689 05 768 T2 | 11/1989 |
| DE | 60 2004 008 323 T2 | 10/2004 |
| EP | 2 036 841 A1 | 9/2008 |
| EP | 2 039 632 A1 | 3/2009 |
| GB | 2 435 257 A | 8/2007 |
| WO | 99/00306 A2 | 1/1999 |
| WO | 99/00306 A3 | 1/1999 |
| WO | 2005/051812 A1 | 6/2005 |

OTHER PUBLICATIONS

European Search Report mailed on Jun. 6, 2012 for EP Patent Application No. 10000040.5, 3 pages.

* cited by examiner

*Primary Examiner* — Saul Rodriguez
*Assistant Examiner* — Gabriela Puig
(74) *Attorney, Agent, or Firm* — Kilpatrick Townsend & Stockton LLP

(57) ABSTRACT

A product gripper for the taking up of a product has two vane blades; a driving means to move the vane blades between a first position, in which the vane blades can be placed onto a support for the product to be taken up at oppositely disposed sides of the product to be taken up, and a second position, in which the vane blades are located at least partly beneath the product to be taken up; and a downholder for the fixing of the product to be taken up while the vane blades are moved beneath it, with the downholder being arranged above a vane blade plane defined by the vane blades.

6 Claims, 2 Drawing Sheets

PRODUCT GRIPPER

CROSS-REFERENCES TO RELATED APPLICATIONS

This application claims priority to German Application No. 10 2009 012331.8, filed Mar. 9, 2009, the disclosure of which is incorporated herein by reference.

BACKGROUND OF THE INVENTION

The invention relates to a product gripper for the taking up of a product, having two vane blades, having a driving means to move the vane blades between a first position, in which the vane blades can be placed onto a support for the product to be taken up at oppositely disposed sides of the product to be taken up, and a second position, in which the vane blades are located at least partly beneath the product to be taken up, and having a downholder for the fixing of the product to be taken up while the vane blades are moved beneath it, with the downholder being arranged above a vane blade plane defined by the vane blades.

Product grippers of this type are used, for example, in the food industry to transfer food products from a first conveying means to a second conveying means, to sort them or to introduce them into a packaging. The product grippers are typically mounted at the moving part of a robot.

In a known product gripper of the initially named kind, the vane blades are rigidly attached to a frame structure of the product gripper and the downholder includes an elastically deformable component whose lower side facing the product to be taken up has a spacing from the vane blade plane in the unloaded state of the product gripper, the spacing being lower than the height of the product to be taken up so that, on the lowering of the product gripper onto the product to be taken up, the elastically deformable component first engages at the product upper side and subsequently the vane blades touch down on the product support. This has the disadvantage that the downholder is supported at the product while the product gripper as a whole is lowered further to bring the vane blades into contact with the product support.

SUMMARY OF THE INVENTION

It is an underlying object of the present invention to provide a product gripper which enables a gentler product handling and releases a product taken up as fast as possible on the putting down thereof.

The object is satisfied in accordance with the invention by a product gripper in which a lower side of the downholder has a spacing from the vane blade plane which is always larger than the height of the product to be taken up or is at least the same as it, and the vane blades are resiliently supported at a frame structure of the product gripper.

The spacing provided in accordance with the invention between the downholder and the vane blade plane has the result that, on the taking up of a product, the product gripper first touches down on the product support with the vane blades, and the downholder only then engages at the product. This means that, on the lowering of the product gripper, it is not the downholder which is supported at the product, but rather the vane blades are supported at the product support while the downholder is brought into engagement with the product. The resilient support of the vane, blades thus contributes to a braking of the product gripper when it is lowered onto a product to be taken up, whereby damage to the product can be better avoided by the lowering downholder.

The cushioned support of the vane blades on the putting down of a product taken up furthermore provides that the downholder and the product can move out of engagement without the vane blades having to be raised off the product support for this purpose. A release of the downholder from the product put down is therefore possible before the vane blades moving from their second position into their first position and the product have moved completely out of engagement. As a result, a faster release of a product put down by the product gripper is achieved.

In accordance with an embodiment, the downholder is movable against the restoring force of spring elements associated with the vane blades toward the vane blades. The spring elements, which can be helical compression springs, for example, are therefore compressed on the lowering of the downholder onto the product. A force oriented away from the product is exerted onto the downholder by the compressed spring elements and contributes, on the one hand, to a fast release of the downholder from the product on its putting down. On the other hand, the bringing into engagement of the downholder with the product against the restoring force of the spring elements on the taking up of the product has the result that the downholder is lowered onto the product to be taken up in a braked manner so-to-say, which contributes to the avoidance of damage to the product.

The spring deflection of the vane blades is preferably dimensioned such that the spacing between the downholder and the vane blade plane can be reduced sufficiently far to fix the product to be taken up between the downholder and the vane blades.

In accordance with a further embodiment, locking means are provided to lock the vane blades at a spacing from the downholder at which the product taken up is held between the downholder and the vane blades. In other words, the locking means provide that the product taken up is held securely by the product gripper in that they prevent the vane blades from being able to move away from the frame structure by a relaxation of the compressed spring elements on the raising of the product gripper from the product support.

The locking means preferably include shoulders connected to the vane blades and corresponding protrusions connected to the downholder.

The locking of the vane blades can be established or released particularly easily when the shoulders connected to the vane blades and the protrusions connected to the downholder extend substantially parallel or obliquely to the vane blade plane since the shoulders and protrusions in this case are brought into engagement simultaneously with the movement of the vane blades from their first position into their second position and can be brought out of engagement by a movement of the vane blades from their second position into their first position.

A particularly simple constructional embodiment of the product gripper is achieved when each vane blade and the shoulder connected thereto are formed in one piece with one another. They can generally also be formed in multiple parts with one another, however. For example, each vane blade and its shoulders associated with it can form parts of a vane.

The protrusions connected to the downholder can be formed by angular pieces attached to the downholder.

The locking means, in particular the protrusions connected to the downholder, are preferably adjustable, in particular vertically adjustable, since the product grip can hereby be set up in a simple manner for the taking up of products with different product heights.

To be able to be matched to the contour of the upper side of the product to be taken up, the downholder is preferably designed as deformable at its lower side. This contributes to the avoidance of damage to the product by the downholder and simultaneously provides a more reliable fixing of the product. If the downholder is designed elastically deformably at its lower side, different products can be fixed reliably and gently despite specific tolerances in the dimensions, in particular in the product height. Generally, the downholder, however, does not have to have any elasticity since the products themselves, in particular food products, usually have a specific compressibility which is sufficient to compensate deviations in the product height.

In accordance with an embodiment, the downholder has a belt band at its lower side. A particularly large-area contact is hereby achieved between the downholder and the product, which contributes to a gentle and reliable fixing of the product.

The invention will be described in the following purely by way of example with reference to an advantageous embodiment and to the enclosed drawing.

DESCRIPTION OF THE PREFERRED EMBODIMENTS

The Figures show a product gripper which is provided, for example as part of a robot, not shown, for the purpose of taking up a product 12, e.g. a food product, lying on a product support 10, e.g. an in-belt, and to put it down at another location.

Figure 1:
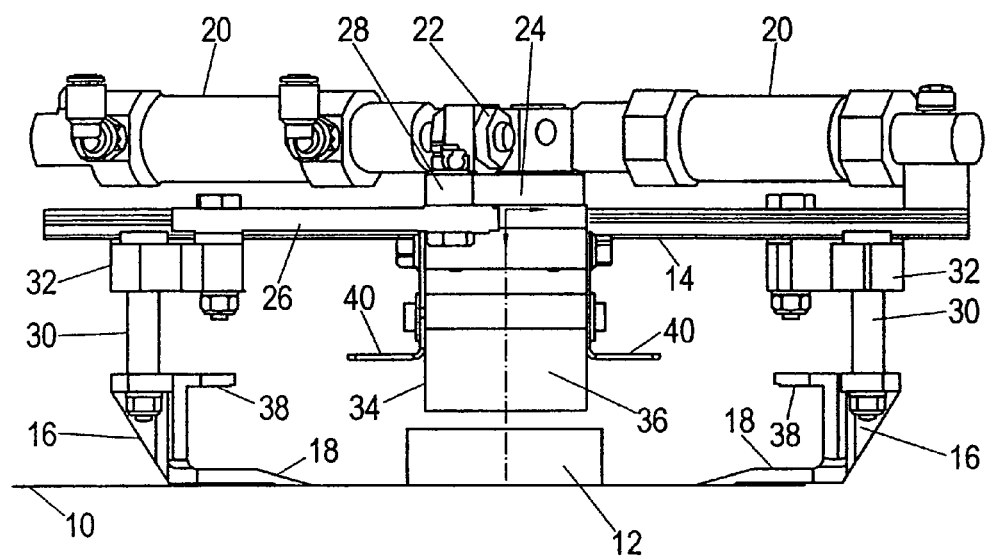
FIG. 1 is a side view of a product gripper in accordance with the invention before the taking up of a product.
Figure 2:
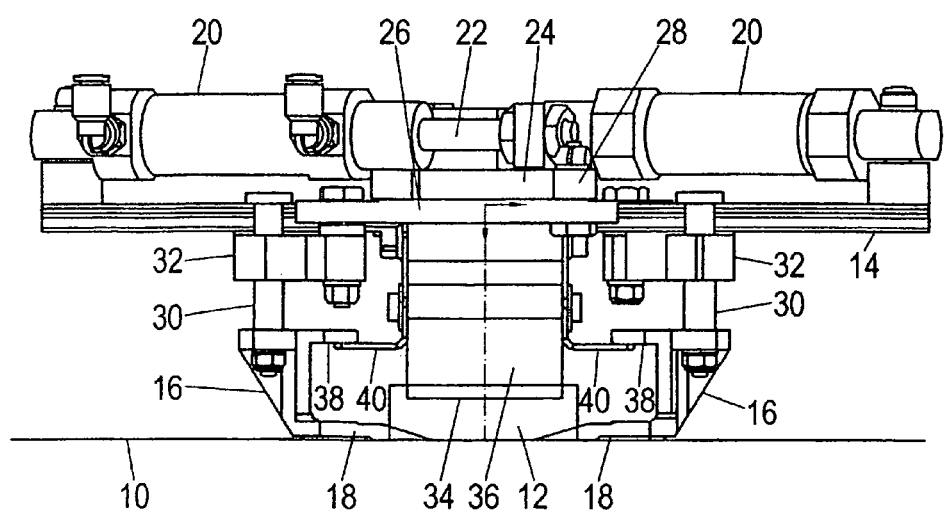
FIG. 2 is a side view of the product gripper of FIG. 1 after the taking up of the product.

The product gripper includes a frame structure 14 to whose lower side two vanes 16 are attached which can be moved from a first position, in which the vanes 16 have such a large spacing from one another that they can be placed onto the product support 10 to the side next to the product 12 (FIG. 1), and a second position, in which the vanes 16 have such a small spacing from one another that they at least partly engage beneath the product 12 (FIG. 2).

Each vane 16 includes a vane blade 18. The vane blades 18 lie in a plane which will be called a vane blade plane in the following.

A drive mechanism which includes two pneumatically or hydraulically actuable cylinders 20 in which respective pistons 22 are displaceably journalled is provided for the movement of the vanes 16 from the first position into the second position and vice versa. The pistons 22 are connected to a lever arm 24 which is rotatably supported at the frame structure 14 centrally about an axis perpendicular to the vane blade plane. The lever arm 24 is connected at its one end 28 via a pivotable connection arm 26 to the one vane 16. At its other end 28, the lever arm 24 is connected via a corresponding connection arm 26 to the other vane 16.

Figure 3:
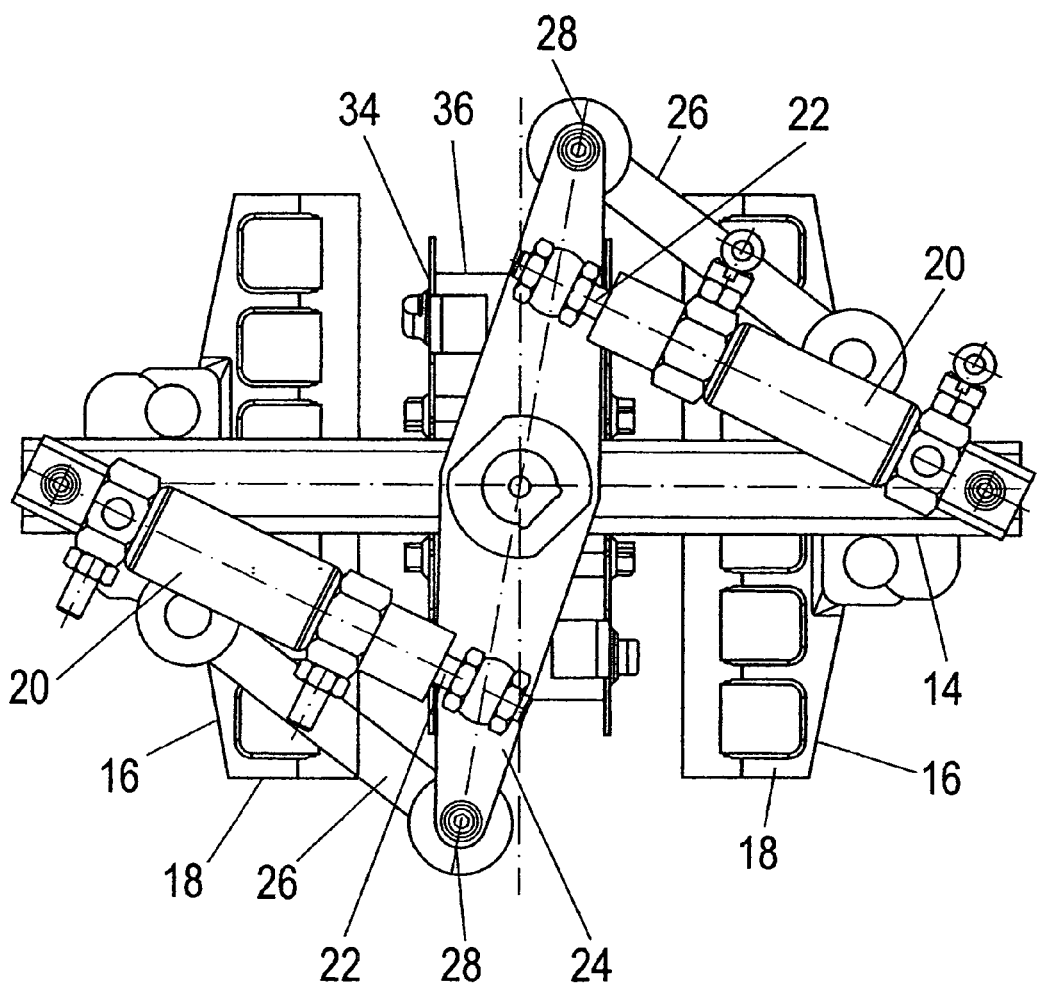
FIG. 3 is a plan view of the product gripper of FIG. 1 before the taking up of a product.

If the pistons 22 have moved into their respective cylinders 20, the vanes 16 are in their first position (FIGS. 1 and 3). If the cylinders 20 are pressurized, the pistons 22 moving out of the cylinders 20 effect a rotation of the lever arm 24 (counterclockwise in FIG. 3) by which the vanes 16 are brought into their second position and the product gripper is closed (FIG. 2). The opening of the product gripper, i.e. the movement of the vanes 16 from their second position into their first position, takes place in the reverse manner in that the pistons 22 are again moved into their respective cylinders 20.

A spring element 30 which is supported in a spring bearing 32 is connected between each connection arm 26 and the vane 16 associated therewith. The spring elements 30 are compression springs which can be compressed by a specific spring deflection. This makes it possible to lower the frame structure 14 even further against the restoring force of the spring elements 30 even if the vanes 16 are already seated on the product support 10.

A downholder 34 is attached centrally between the vanes 16 to the lower side of the frame structure 14 which serves to fix the product 12 to be taken up and to prevent a slipping of the product 12 while the vane blades 18 are slid beneath the product 12.

At its lower side, the downholder 34 has a belt band 36 which has a basic orientation parallel to the vane blade plane. The belt band 36 is, however, installed so loosely that it sags a little in the unloaded state of the product gripper and can adapt to the upper side contour of the taken up product 12 in the loaded state of the product gripper. It is self-explanatory that the softer the material is, the better the adaptability of the belt band 36.

The belt band 36 is fastened to support elements of the downholder 34 which extend substantially parallel to the vane blade plane. The belt band 36 can, for example, be wound around correspondingly oriented bars or rollers in the form of an endless belt band.

The downholder 34 is dimensioned such that the spacing between the lower side of the band belt 36 and the vane blade plane is larger than the height of the product 12 to be taken up in the unloaded state. At the same time, the spring deflection of the spring elements 30 is dimensioned so large that the frame structure 14 and thus also the downholder 34 can still be lowered so far after the touching down of the vanes 16 onto the product support 10 that the belt band 36 moves into engagement with the product 12 to be taken up and urges it toward the product support 10 with a fixing force sufficiently large to fix the product 12.

Since the downholder 34 is urged onto the product 12 from above, it is self-explanatory that it applies at least to that section of the belt band 36 which is in engagement with the product upper side that the spacing between the downholder 34 and the vane blade plane can also never be smaller than the product height in the loaded state of the product gripper. At most those sections of the downholder 34 which project laterally beyond the taken up product, in particular the sections of the belt band 36 which contact the support elements, can have a spacing from the vane blade plane which is smaller than the product level since the belt band 36 is deflected upwardly by the taken up product 12 due to its mentioned loose support.

As already mentioned, the spring elements 30 are compressed in the loaded state of the product gripper. To prevent the vanes 16 from being urged away from the downholder 34, i.e. downwardly, by the compressed spring elements when the loaded product gripper is being raised or is raised from the product support 10, locking means are provided which effect a latching of the vanes 16 at a predetermined basic spacing relative to the downholder 34.

The locking means include, on the one hand, shoulders 38 formed at the vanes 16 and, on the other hand, angular pieces 40 which are associated with the shoulders 38 and which are attached to the downholder 34. Both the shoulders 38 and the angular pieces 40 extend substantially parallel to the vane blade plane so that the shoulders 38 of the vanes 16 can slide over the angular piece 40 respectively associated with them on a movement of the vanes 16 from the first position into the second position, i.e. that is, on the moving together of the vanes 16, and—conversely—can easily come free from it on the moving apart of the vanes 16. Alternatively, the shoulders 38 and/or the angular pieces 40 can also be oriented obliquely to the vane blade plane.

In the present embodiment, the vanes 16 are components which are in one piece and which include both the vane blades 18 and the shoulders 38. Alternatively, a multi-part embodiment of the vanes 16 is also conceivable.

The angular pieces 40 can be attached to the downholder 34 in a vertically adjustable manner. This enables a setting of the predetermined basic spacing between the downholder 34 and the vane blade plane in the loaded state of the product gripper, whereby the product gripper can be set up for the taking up of different kinds of products. If the angular pieces 40 are moved away from the frame structure 14 (that is, downwardly in FIGS. 1 and 2), the predetermined basic spacing between the downholder 34 and the vane blade plane becomes larger and higher products can be taken up. Conversely, the angular pieces 40 must be moved in the direction of the frame structure 14 (that is, upwardly in FIGS. 1 and 2) to reduce the predetermined basic spacing between the downholder 34 and the vane blade plane and thereby also to be able to reliably take up products 12 of a smaller height.

To be able to better compensate small tolerances in the product height, a belt band 36 can be used which has a specific elasticity. The downholder 34, however, generally does not need to have any elasticity since a compressibility of a taken up product 12 itself can be sufficient to compensate deviations in the product height.

For the taking up of a product 12, the product gripper is lowered onto the product support 10 until the vanes 16 touch down on the product support 10 laterally next to the product. The product gripper is afterward urged further downwardly under the compression of the spring elements 30 until the downholder 34 engages at the upper side of the product 12 and presses onto the product 12 with a predetermined fixing force.

The product gripper is now closed; i.e. the vanes 16 are moved from their first position into their second position, with the vane blades sliding beneath the product 12.

At the same time, the shoulders 38 of the vanes 16 move over the angular pieces 40 of the downholder 34. In this respect, the shoulders 38 have a specific spacing from the angular pieces 40 due to the pressing down of the product gripper for the fixing of the product 12 viewed in the vertical direction. If the product gripper is now raised from the product support 10 for the transfer of the taken up product 12, the spring elements 30 can relax so much until the shoulders 38 of the vanes 16 abut the angular pieces 40 of the downholder. The product 12 is now held in the product gripper with a holding force which is smaller than the fixing force, but is nevertheless sufficient to prevent a slipping of the product 12 on the vanes 16.

The vanes 16 are moved apart to put down a taken up product 12. As soon as the shoulders 38 of the vanes 16 and the angular pieces 40 of the downholder move out of engagement in this respect, the spring elements 30 relax and the product 12 is abruptly released from the downholder 34.

The shoulders 38 of the vanes 16 and the angular pieces 40 of the downholder are preferably dimensioned in the direction parallel to the vane blade plane such that they move out of engagement exactly when the vane blades 18 and the product 12 move out of engagement. The product 12 to be put down is in this manner substantially simultaneously released from the downholder 34 and the vanes 16.

The invention claimed is:

1. An apparatus for taking up a product, comprising:
   a frame;
   at least two vane blades disposed beneath the frame and biased away from the frame, wherein the vane blades are configured to rest on a surface and to slide inward relative to one another along the surface; and
   a downholder disposed beneath the frame between the vane blades, wherein the downholder and frame are downwardly movable against the bias from a rest position, at which the downholder is above the product, to a support position, at which the downholder is adjacent the product.

2. The apparatus of claim 1, further comprising a lock configured to lock the vane blades at a spacing from the downholder at which the product is held between the downholder and the vane blades.

3. The apparatus of claim 2, wherein the lock comprises a shoulder connected to one of the vane blades and a corresponding protrusion connected to the downholder.

4. The apparatus of claim 2, wherein the lock is adjustable.

5. The apparatus of claim 1, wherein the downholder is deformable at a lower side thereof.

6. The apparatus of claim 1, further comprising a belt band disposed at a lower side of the downholder.

* * * * *